United States Patent Office 3,063,974
Patented Nov. 13, 1962

3,063,974
POLYMERS OF FULVENO-METALLIC COMPOUNDS
Roy L. Pruett, Tonawanda, and Edward L. Morehouse, Snyder, N.Y., assignors to Union Carbide Corporation, a corporation of New York
No Drawing. Filed Dec. 10, 1956, Ser. No. 627,099
2 Claims. (Cl. 260—80)

This invention relates to a process for the production of organo-metallic compounds and to the compounds produced. More particularly, it pertains to the preparation of difulveno-metallic compounds which contain iron as the metal component and to a method for their preparation.

It is a principal object of the present invention to provide difulveno-iron compounds.

A particular object of the invention is the preparation of iron compounds of a fulvene. Other objects of the invention will in part be obvious and will in part appear hereinafter.

This invention provides fulveno-iron compounds having the general empirical formula $$R'_2Fe$$

where R' is a residue of a fulveno-compound containing a fulveno-carbon ring having the structure:

It will be noted that the fulveno-carbon ring has a cross conjugated structure wherein the double bond between the non-ring carbon atom and the carbon atom of the five carbon alicyclic ring is in conjugated relation with the double bonds in the ring.

A specific example of a compound containing the fulveno-carbon ring structure is fulvene, which has the formula:

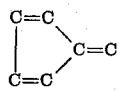

Compounds having both double bonds in the ring coordinately shared with an aromatic ring are to be avoided. One of the ring double bonds may be coordinately shared with (i.e. form part of) an aromatic ring but not both. Where both such bonds are coordinately shared with an aromatic ring the five carbon ring is no longer a constituent of a fulveno-carbon ring, and there is in fact no six carbon fulveno structure.

The iron may be utilized in either a higher or a lower state of oxidation. It is often preferred to employ it in a lower state of oxidation, and especially when conservation of reactants may thereby be effected. When ferric chloride is employed, one molecule of the alkali metal derivative of the fulvene may be utilized in reducing each molecule to the ferrous state and hence becomes unavailable to form the fulveno-iron compound, but when ferrous chloride is utilized, none of the alkali metal derivative of the fulvene is thus expended in reducing iron to a lower state of oxidation.

The process of the present invention involves two phases. The first phase comprises formation of an alkali metal, e.g., sodium, potassium or lithium derivative of a fulvene as defined above, and the second phase comprises reaction of this alkali metal derivative with a halide of iron. Both reactions are essentially reactions in solution, wherein the employment of suitable solvents greatly facilitates the conduct of the desired reaction in each of the phases. Furthermore, any of the halogens, viz., chlorine, bromine, iodine and fluorine, may comprise the halogen portion of the iron halide.

The generic formula for the compounds may be represented as:

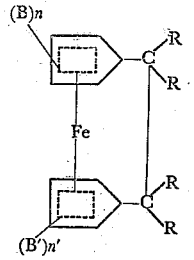

where B and B' are hydrocarbon substituent groups attached to the 5-carbon ring, such as aliphatic, for example methyl, ethyl, propyl, butyl, allyl and the like, aromatic such as phenyl, aminophenyl, aralkyl such as tolyl and a substituent wherein one but not both of the ring double bonds is coordinately shared by an aromatic ring as for example the five carbon ring together with the aromatic ring being an indenyl or substituted indenyl ring; $n$ and $n'$ are 0 to 4 where B or B' to which it pertains is monovalent and 0 or 1 where B or B' to which it pertains is divalent and R represents a monovalent organic hydrocarbon radical such as alkyl, alkenyl, aryl, alkaryl, aralkyl and hydrogen. The unsaturation in each of the fulveno carbon rings is shown conventionally as migratory.

In the practice of the invention, the new compounds are produced by reaction of two moles of a fulvene with an iron halide in the presence of an equivalent amount of an alkali metal, e.g., sodium, potassium and lithium.

The fulvenes may be represented as:

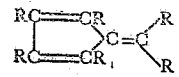

wherein R is a monovalent organic aliphatic or aromatic hydrocarbon group, such as alkyl, alkenyl, aryl, alkaryl, aralkyl, and hydrogen. They may be prepared by condensing cyclopentadiene with a ketone or an aldehyde in the presence of a small amount of base, e.g., the hydroxides of sodium and potassium.

wherein R" is hydrogen and a hydrocarbon radical, the R"'s being either simple or mixed. Fulvenes may also be prepared by the reaction of alkali metal-cyclopentadiene or substituted cyclopentadiene with the carbonyl group of an aldehyde as for example a reaction which may be represented as follows:

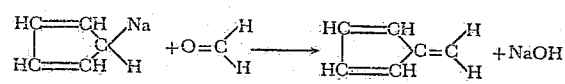

The exact mechanism of reacting a fulvene with an iron halide in the presence of an alkali metal is not known with certainty, but, it is believed, it may be represented as follows:

(1)
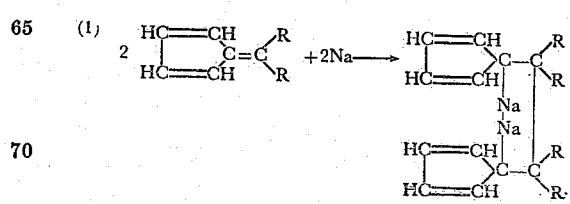

(2) 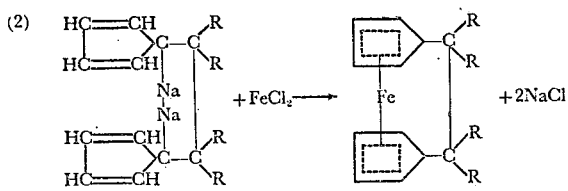

R has the same meaning as above. The compounds may thus be regarded as comprising a heterocyclic carbon-iron ring.

The fulvenes are named by numbering the substituents according to the following numbered structure:

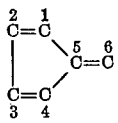

The fulvene compound employed according to this invention desirably, but not necessary, contains a reactive hydrogen on the methylene carbon (6) attached to the alicylic cyclopentadienyl carbon ring, but the number and character of substituents on the carbon ring may otherwise be varied. Examples of such substituents are aliphatic radicals, as for example methyl, ethyl, butyl, heptyl, allyl and vinyl, and aromatic radicals, as for example phenyl, aminophenyl, benzyl and tolyl.

Some of the fulvenes which may be employed are: 6,6-dimethylfulvene, 6-(3-heptyl) fulvene, 6(butenyl-3)fulvene, 6-methyl-6-phenylfulvene, 6-methyl-6-insobutylfulvene, 6-methyl-6-isopropylfulvene, methyl 6-(3-heptyl-fulvene, 6,6-di-n-propylfulvene, and 6-methyl-6-(3-aminophenyl) fulvene. These are not to be considered as limitative but are given merely for purpose of illustration.

The fulveno-iron compounds may be prepared by dissolving the fulvene in a suitable solvent, and then either adding a reactive form of alkali metal followed by the addition of an iron halide or the halide may be first added, followed by addition of the alkali metal. This latter order of addition has given increased yields. The reaction is exothermic and should be controlled by cooling to maintain a temperature not above about 50° C. and preferably below about 35° C. The iron-fulvene compound may be recovered by various means, as for example by evaporation of the solvent after filtering off the alkali metal chloride, and the residue purified by distillation at low pressure or by recrystallization.

Halides of iron where the iron is in a higher state of oxidation may be employed but in such case substantial amounts of the fulvene and alkali metal are utilized in reducing the iron to its lower valence state. Thus, ferric chloride may be used but such use requires substantial quantities of fulvene and of sodium for reduction thereof to ferrous chloride.

A number of solvents may be employed for the reactants, of which mention may be made of diethyl ether, ethylene glycol methyl phenyl ether, propylene glycol dimethyl ether, diethyl acetal, dibutyl acetal, methyl phenyl ether, methyl morpholine, triethylamine and benzene. These solvents, although operable, result in a slow reaction and small yields. In contrast to such results, alkylene and polyalkylene glycol dialkyl ethers, such as the ethylene glycol diemthyl and diethyl ethers and the di-, tri- and tetra-ethylene glycol dialkyl ethers, as for example diethylene glycol dimethyl ether and tetraethylene glycol dimethyl ether, hereinafter referred to as glycol dialkyl ethers, and also certain cyclic ethers, such as dioxane and tetrahydrofuran, are admirably adapted as solvents for these reactions, giving rapid and satisfactory reaction. The glycol lower dialkyl ethers, such as dimethyl, diethyl, dibutyl and dipropyl ethers of alkylene and polyalkylene glycols, are preferred.

The alkali metal dispersion may be prepared by agitation of the alkali metal in an non-reactive liquid at a temperature above the melting point of the alkali metal.

Glycol dialkyl ethers are suitable liquids for accomplishing this dispersion. Diethylene glycol dimethyl ether, which has a boiling point of 162° C., is particularly well adapted for preparation of the finely divided sodium, or potassium, according to this procedure.

The glycol dialkyl ethers, preferably glycol lower diakyl ethers, are distinctively adapted as solvents for the reactions of this invention since they are well suited as solvents for production of the fulven-alkali metal compounds and for their reaction with an iron halide, as well as for reduction of the iron halide to a lower state of oxidation. This uniquely satisfactory suitability of the glycol ethers as solvents for the reactions greatly facilitates the carrying out of the process.

During reactions for formation of alkali metal derivative of the fulvene and during reactions of the fulvene-alkali metal compound with an iron halide, as well as in the reduction of an iron halide in glycol dialkyl ether, it is desirable to maintain an inert atmosphere over the reactants and reaction mixtures. Suitable inert atmospheres include nitrogren, argon and other inert gases.

As illustrative embodiments of a manner in which the invention may be practiced, the following examples are presented. In each of these examples inert atmospheres were maintain during all stages of the procedure except where otherwise specifically noted.

EXAMPLE I

*1,1'-(5,8-Diethyldodecylidene-6,7)Ferrocene*

REACTIONS (1) Preparation of 6-(3-heptyl)fulvene

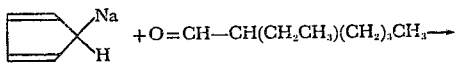

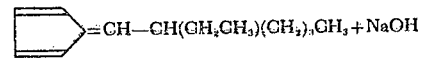

I.

(2) Reaction of sodium with 6-(3-heptyl)fulvene

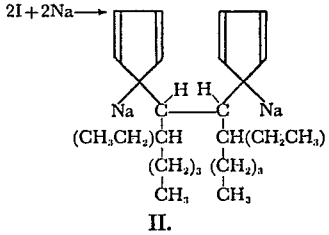

II.

(3) Reaction of 6-(3-heptyl)fulveno sodium with ferrous chloride

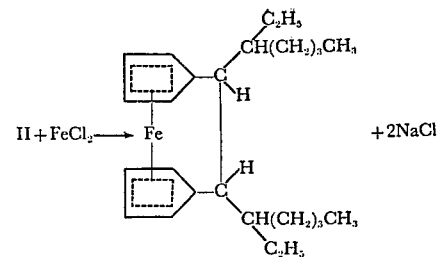

PROCEDURE

Cyclopentadienyl sodium (0.5 mole) was prepared by the dropwise addition of 46.5 ml. of cyclopentadiene to 0.5 mole of sodium dispersion in 600 ml. ethylene glycol dimethyl ether. An equimolar quantity of 2-ethylhexaldehyde was added at 0°–10° C. To the resulting slightly viscous yellow slurry (product of reaction (1) above) was slowly added 0.5 mole of sodium (40% Na in xylene dispersion) at a temperature of 10°–42° C. No hydrogen evolution was observed and the tan slurry was agitated 1.5 hr. Ferrous chloride (0.25 mole) was prepared by the addition of 12 g. iron powder to 0.167 mole, 27.1 g. ferric chloride in 500 ml. ethylene glycol dimethyl ether and heating the mixture at reflux for 2 hr. The ferrous chloride was added to the tan slurry at room temperature giving a brown suspension which was agitated for three hours. Grey solids settled from a red-brown liquor. Approximately 100 ml. of the liquor were washed with dilute HCl (10% HCl), then washed with water and dissolved in benzene. An organic layer separated and was dried over anhydrous sodium sulfate for 1 hr. and filtered. The red filtrate was stripped of solvent at atmospheric pressure and maximum pot temperature of 107° C. Crystals were obtained therefrom by filtering, and recrystallized from petroleum ether. They had a melting point 135°–165° C., and appeared to be ferrocene, i.e., bis(cyclopentadienyl)iron.

The remainder of the reaction mixture was filtered and the brown filtrate was stripped at pot temperature of 130° C. The residue was placed in a "Hickman" molecular still and 2.6 g. of red liquid, B.P. 160°–180° C. at 5μ Hg was recovered. The distilled product was found by analysis to be a mixture of 1,1′-(5,8-diethyldodecylidene-6,7)ferocene and an organic polymer, $$[C_5H_4-CH-CH(CH_2CH_3)(CH_{23}CH_3)]_x$$

A better yield of the compound was obtained by the method of Example V, wherein the fulvene and ferrous chloride were combined prior to the addition of the sodium dispersion. That order of addition is believed to avoid loss of the fulvene reactant through sodium catalyzed organic polymerization reactions.

EXAMPLE II

Dimethylfulvene

In a 2-liter, 3-neck round-bottom flask equipped with mechanical stirrer, thermometer, water-cooled condenser and separatory funnel, purged with argon, there were placed equimolar quanitties of freshly distilled cyclopentadiene (7.8 mole, 514.8 g., 670 ml.) and of anhydrous acetone (7.8 mole, 453 g., 566 ml.). Temperature was decreased to 0° C. with solid carbon dioxide-acetone bath. Potassium hydroxide (60 g.) was dissolved in 300 ml. of absolute ethanol and charged to a separatory funnel. The caustic solution was added slowly over 1¼ hr. to the acetone-cyclopentadiene mixture with stirring and maintaining temperature between 0 and −5° C. with cold bath. Mixture gradually changed from water-white to dark brown after addition of caustic was completed. Stirring was continued for 2 hr. while reaction temperature was allowed to rise to room temperature. The water layer was separated and the organic layer dried over anhydrous sodium sulfate overnight. Mixture was filtered and dark brown filtrate was placed in a 2-liter distilling flask fitted with a 50 cm. Vigreaux column and fractionated at reduced pressure. An orange liquid, dimethyl fulvene, was collected over a boiling point range of 39°–45° C. at 8–10 mm. Hg. The dimethyl fulvene was used for the preparation of 1.1′-(2,3-dimethyl butylidene-2,3)ferrocene, as described in Example III.

EXAMPLE III

1,1′-(2,3-Dimethylbutylidene-2,3)Ferrocene

REACTION (1) Preparation of sodium salt of dimethylfulvene:

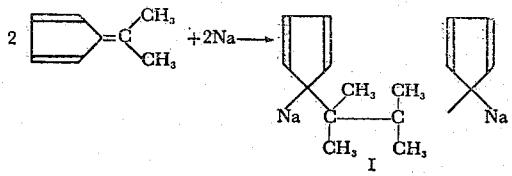

(2) Preparation of 1,1′-(2,3-dimethylbutylidene 2,3)-ferrocene:

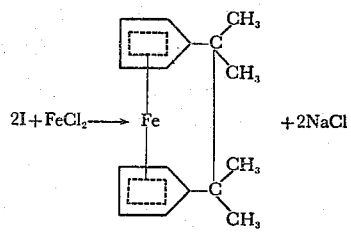

PROCEDURE

To a 1-liter, 4-neck creased flask equipped with thermometer, mechanical stirrer, water-cooled condenser and dropping funnel, purged with argon, there was charged 0.18 mole sodium (40% Na in xylene dispersion) in 400 ml. of ethylene glycol dimethyl ether. An equimolar quantity (19.3 g) of dimethyl fulvene, prepared as in Example II, was added from the dropping funnel with stirring. The reaction was exothermic and temperature was controlled between 20°–30° C. with a solid carbon dioxide-acetone bath. After the addition, the dark brown mixture was agitated for 4.5 hr. Ferrous chloride (0.09 mole) prepared by heating 4 g. of iron powder with 9.8 g. of ferric chloride in 200 ml. ethylene glycol dimethyl ether at reflux (85° C.) for 2 hr., was charged to the dropping funnel. The ferrous chloride was added slowly to the stirred sodium-fulvene mixture while controlling temperature at 25° C., with a cold bath. Resulting brown-green suspension was agitated for 4 hr. and filtered by suction. The filtered solids were washed with benzene until nearly colorless. The red filtrate was stripped at atmospheric pressure to a maximum pot temperature of 115° C., and the stripped residue treated with isopropanol. This precipitates the dimethyl fulveno-iron product as a red-orange solid, which is removed by filtration and then dried. Two recrystallizations from n-heptane gave an orange solid, 1,1′-(2,3-dimethyl-buylidene-2,3)-ferrocene of M.P. 137–145° C.

EXAMPLE IV

6-(3-Heptyl)Fulvene

REACTION

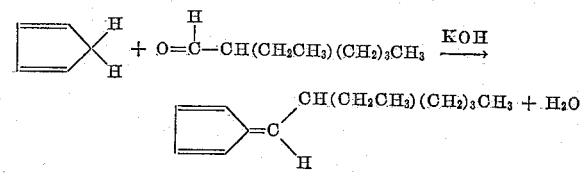

PROCEDURE

A 1-liter, 4-neck, creased flask fitted with mechanical stirrer, water-cooled condenser, thermometer and dropping funnel and purged with argon, was charged with freshly dissolved potassium hydroxide (20% in ethanol). Freshly distilled cyclopentadiene (1.1 mole, 72 g.) and 2-ethylhexaldehyde (1.0 mole, 128.2 g.) were mixed; placed in a dropping funnel, and added slowly to the caustic solution with stirring over a temperature range of 20°–30° C. Temperature was controlled with solid carbon dioxide-acetone bath over a one-hour period. Reaction mixture gradually turned from clear and homogeneous to a dark brown, mildly viscous liquid, which was dissolved in ether and washed with water. The water layer was separated, and the organic layer was allowed to dry over anhydrous sodium sulfate overnight. Solids were filtered, and the filtrate was stripped of solvent and low-boiling materials. The stripped product was charged to a 250-ml. distilling flask fitted with a 20-cm. Vigreaux column and fractionated at reduced pressure. An orange liquid, 6-(3-heptyl)fulvene, was collected over the range 74°–77° C. at 0.5 mm. Hg. The 6-(3-heptyl)fulvene was utilized for the preparation of 1,1'-(5,8-diethyldodecyl-idene-6,7)ferrocene, as described in Example V.

EXAMPLE V

1,1'-(5,8-Diethyldodecylidene-6,7)Ferrocene

REACTION

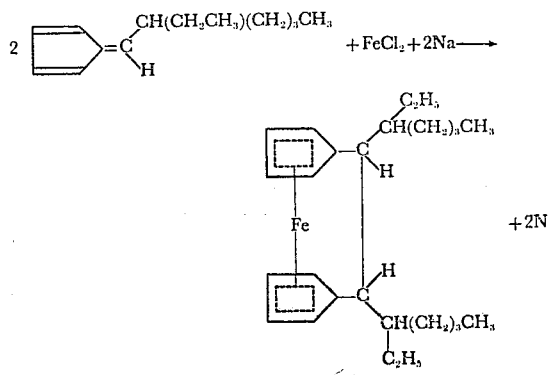

PROCEDURE

Anhydrous ferric chloride (27.1 g.) and iron powder (12.2 g.) were placed with 500 ml. of ethylene glycol dimethyl ether in a 1-liter, 4-neck creased flask fitted with stirrer, thermometer, condenser and dropping funnel, and heated at reflux (85° C.) for 2 hr. Mixture was cooled to room temperature and 0.5 mole of 6-(3-heptyl)fulvene prepared as in Example IV was added. To the dropping funnel there was charged an equimolar quantity of sodium (42.3% Na in xylene dispersion). The sodium was added to the mixture while the temperature was controlled at 25°–30° C. with a solid carbon dioxide-acetone cold bath. Reaction was exothermic and the addition of sodium was completed in 25 min. The resulting dark brown mixture was heated at reflux for 1.5 hr. with stirring. The mixture was then allowed to settle overnight under argon atmosphere. The dark brown liquid was decanted through a fritted glass filter, and solids separated were washed with ethanol. The ethanol was added to the filtrate and stripped under water aspirator pressure in a water bath at 75° C. The residue, a dark, red-brown oil, was dissolved in chloroform and washed with water. The chloroform-organic layer was separated and dried with anhydrous sodium sulfate. The mixture was then filtered and the filtrate was stripped of solvent under water aspirator pressure under argon at a pot temperature of 80° C. The resulting product was a dark, red-brown oil. Infra-red analysis showed that the crude product was contaminated with an unsaturated organic polymer.

A portion, 30.4 g., of the crude reaction product was fractionated at reduced pressure in a "Hickman" molecular still under mercury diffusion. A dark, red-brown liquid was collected over the range 115°–125° C. at 5μ Hg. Infra-red analysis confirmed the product to be 1,1'-(5,8-diethyldodecylidene-6,7)ferrocene.

EXAMPLE VI

1,1'-(2,3-Diphenylbutylidene-2,3)Ferrocene

REACTION

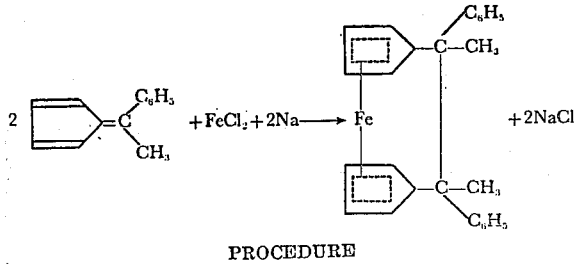

PROCEDURE

Into a 1-liter, 4-neck creased flask equipped with condenser, dropping funnel, stirrer and thermometer and purged with argon, there were placed 27.1 g. ferric chloride and 12.4 g. iron powder in 500 ml. dried ethylene glycol dimethyl ether, and heated at reflux (85° C.) for 2 hr. to make ferrous chloride. The mixture was allowed to cool to room temperature under argon atmosphere and to this was added methylphenylfulvene (0.5 mole, 72 g.), which had been prepared by the alkaline condensation of cyclopentadiene with methyl phenyl ketone. Sodium dispersion, 0.5 mole (42.3% Na in xylene dispersion) was charged to the dropping funnel and added slowly over a period of 25 min. controlling temperature between 25°–30° C. with a solid carbon dioxide-acetone cold bath. After the sodium was added, the dark brown mixture was heated at reflux for 2 hr., then allowed to cool and settle overnight at room temperature.

The mixture was decanted through a fritted glass filter covered with "Celite," a filter aid, under reduced pressure and protected with an argon atmosphere. The solids were washed carefully with ethanol and the washings added to the ethylene glycol dimethyl ether filtrate. The dark brown liquid was stripped under water-aspirator pressure at a pot temperature of 60° C. The resulting dark, red-brown oil was dissolved in chloroform and washed with dilute hydrochloric acid. A chloroform-organic layer separated, which was dried over anhydrous sodium sulfate, filtered and stripped at reduced pressure (25–35 mm. Hg) at pot temperature of 70° C. A dark, red-brown rather viscous liquid remained. Fractional distillation of this product in a "Hickman" molecular still gave a dark, red-brown liquid, B.P. 138°–165° C. at 5 mu–3 mu Hg. Infra-red measurements confirmed the product to be 1,1'-(2,3-diphenylbutylidene-2,3)ferrocene.

EXAMPLE VII

1,1'-(2,4,5,7-Tetramethyloctylidene-4,5)Ferrocene

REACTION (1) Preparation of sodium salt of methyl isobutyl fulvene

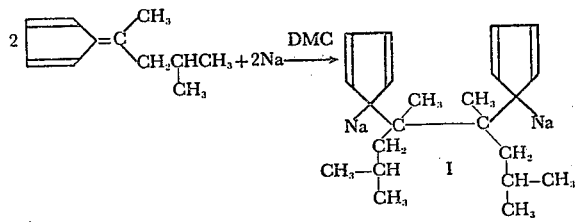

(2) Reaction of sodium salt with ferric chloride

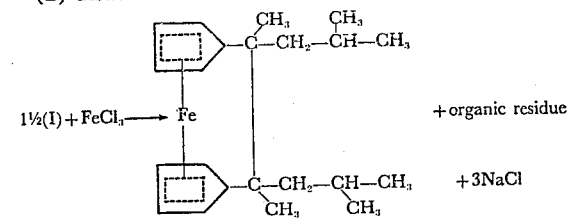

PROCEDURE

A 2-liter, 4-neck flask was fitted with a reflux condenser attached to a stream of argon, thermometer, dropping funnel and mechanical stirrer. The flask was flushed with argon and in it were placed 27.2 g. of 42.3% sodium dispersion in xylene (11.5 g.; 0.50 mole sodium) and 400 ml. of dry ethylene glycol dimethyl ether. To the stirred mixture were added, over a period of 10 min., 81 g. (0.55 mole) of methyl isobutyl fulvene prepared by the condensation reaction of cyclopentadiene and methyl isobutyl ketone. The mixture was allowed to warm to 60° C. and was maintained at 50°–60° C., first by cooling, and later by application of heat.

After all the sodium had been added, the mixture was heated at 50°–60° C. for 1 hr., and then at reflux temperature (80° C.) for 2 hr., after which all the sodium had disappeared and the reaction mixture was a clear, red solution.

A mixture of 27.1 g. FeCl₃ (0.167 mole) in 150 ml. of ethylene glycol dimethyl ether was added in portions. Each addition gave a momentary brown precipitate which appeared to dissolve. The temperature was 60°–80° C. After the addition was complete, the heating was continued for 2 hr. The final mixture consisted of a red liquid and light brown solid.

The mixture was filtered in an inert atmosphere. 50 ml. of ethanol were added to the filtrate, which caused no reaction. The liquid was stripped at 50°–55° C. and reduced pressure (25–30 mm. Hg). The residue, a dark red liquid, was dissolved in chloroform and the chloroform solution was washed once with dilute hydrochloric acid, once with water, dried over anhydrous Na₂SO₄, and stripped at 50°–60° C. at reduced pressure (25–30 mm. Hg).

The residue was charged into a "Hickman" molecular still and distilled at 170°–180° C. and 2–4 microns mercury.

The distilled material was chromatographed on Al₂O₃ and a purified material was thus obtained.

EXAMPLE VIII 1,1'-(2,3,4,5-Tetramethylhexylidene-3,4)Ferrocene

REACTION (1) Preparation of sodium salt of methyl-i-propyl-fulvene.

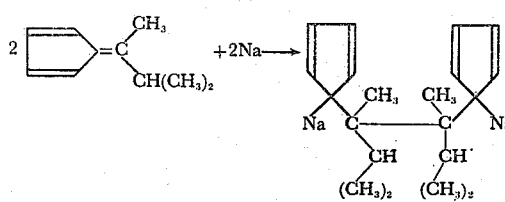

(2) Reaction of the fulveno-sodium with ferrous chloride.

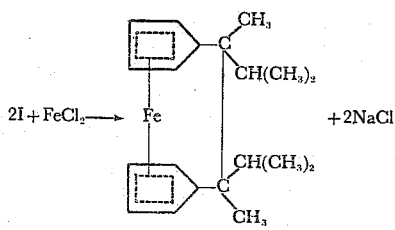

PROCEDURE

To a 2-liter, 4-neck creased flask fitted with stirrer, thermometer, water-cooled condenser and dropping funnel purged with argon, there was charged 0.5 mole sodium (42.3% Na in xylene dispersion) with 500 ml. of dried ethylene glycol dimethyl ether. Methyl-iso-propylfulvene (0.55 mole, 75.0 g.) from the alkaline condensation of cyclopentadiene and methyl isopropyl ketone, was charged to the dropping funnel and added slowly to the sodium dispersion with stirring, under an argon atmosphere. Time of addition was 45 min. and temperature was controlled between 20°–25° C. with solid carbon dioxide-acetone cold bath. Ferrous chloride, prepared by the reduction of ferric chloride with iron powder in refluxing ethylene glycol dimethyl ether for 2 hr., was placed in the dropping funnel and added intermittently to the red-brown sodium-fulvene mixture with stirring. The reaction, which was slightly exothermic, was carried out over the range 20°–30° C. Addition was completed in 1 hr. The resulting dark brown mixture was heated to reflux for 1 hr. with stirring, then cooled to room temperature and allowed to stand overnight under argon.

The dark brown liquid was decanted through fritted glass with suction to remove soilds. Ethanol, when added to the filtrate gave no apparent reaction indicating the absence of unreacted sodium. Solvents were stripped from the reaction mixture leaving a dark brown gum. This was dissolved in chloroform and washed with distilled water. The dark brown organic layer was separated and dried over anhydrous sodium sulfate. Solids were filtered and the filtrate was stripped at water aspirator pressure (30–40 mm. Hg) in a hot water bath (to 60° C.). The resulting dark brown oil was charged to a 250 ml. distilling flask fitted with a 20 cm. Vigreaux column and fractionated at reduced pressure. A dark red-brown liquid was collected over the boiling point range of 150°–160° C. at 1.2 mm. Hg. Infra-red analysis showed the product to be contaminated with an unsaturated organic polymer.

The impure iron compound was dissolved in n-heptane (2% solution) and chromatographed by passing through a column of activated alumina (2.5 ft. in length, 2 in. I.D.). Three distinct bands separated. The product was removed from the column by washing with chloroform. Chloroform was stripped and the remaining red-brown liquid analyzed. Results of the elemental and infra-red analysis showed that the unsaturated contaminant had been removed and the desired iron compound obtained by chromatographic means.

EXAMPLE IX

Methyl-6-(3-Heptyl)Fulvene

REACTION

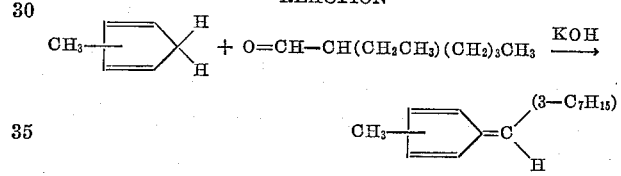

PROCEDURE

Into a 2-liter, three-neck, round bottom flask equipped with mechanical stirrer, water-cooled condenser, thermometer and dropping funnel there were placed 40 g. potassium hydroxide pellets which were covered with 200 ml. of absolute ethanol. The pellets dissolved in the alcohol with stirring. A 2:1 molar mixture of methyl-cyclopentadiene and 2-ethylhexaldehyde was charged to the dropping funnel and added slowly to the alcoholic base. Reaction was exothermic with temperature controlled at 25°–35° C. with a solid carbon dioxide-acetone cold bath. Time of addition was 1.5 hr. Crude mixture was dissolved in diethyl ether, and washed with cold water. The ether-organic layer was separated, dried over anhydrous sodium sulfate and fractionated at reduced pressure through a Vigreaux column. Low boiling and unreacted materials were collected in a solid carbon dioxide-acetone cold trap and the high-boiling products were separated. Methyl-6-(3-heptyl) fulvene, an orange liquid, was thus obtained having boiling point range 80°–85° C. at 1.0 mm. Hg.

EXAMPLE X 1,1'-(5,8-Diethyldodecylidene-6,7)Dimethylferrocene

REACTION

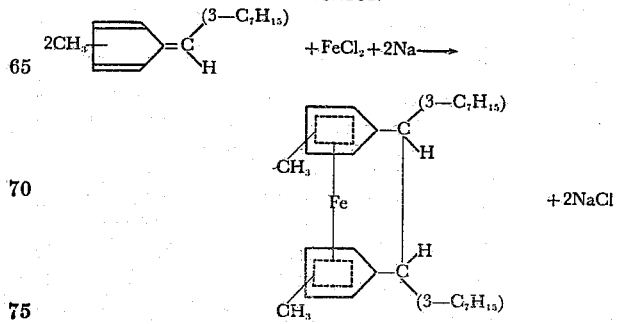

PROCEDURE

A 2-liter, 4-neck, creased flask was fitted with a dropping funnel, thermometer, mechanical stirrer, and condenser and purged with argon. To the flask were charged 54 g. anhydrous ferric chloride and 24 g. of iron powder with 1000 ml. of dried ethylene glycol dimethyl ether. The mixture was heated at reflux (85° C.) for 2 hr. After the mixture had cooled to room temperature, methyl-6-(3-heptyl) fulvene was placed in the flask. Sodium dispersion was charged to the dropping funnel and covered with 150 ml. dried ethylene glycol dimethyl ether. The sodium was added slowly to the fulvene-ferrous chloride mixture with stirring. Temperature was controlled between 20°–30° C. by using a solid carbon dioxide-acetone cold bath. Time of addition was approximately 25 min. Mixture was then heated at reflux (85° C.) for 1.5 hr. When cooled to room temperature, it was filtered through fritted glass covered with "Celite," under suction. The filtrate was stripped of solvent at water aspirator pressure in a hot water bath. There remained a dark brown oil which was dissolved in chloroform and washed with water. The organic layer was separated and placed under reduced pressure (water aspirator) in a hot water bath. Solvent and low-boiling materials were stripped. The remaining dark red-brown thin oil was charged to a "Hickman" molecular still and fractionated at diminished pressure using a Mercury diffusion apparatus. A dark red-brown liquid was collected at 113°–123° C. at $5\mu$ Hg. Its elemental analysis agreed with the above product formula. Redistillation gave a pure compound.

EXAMPLE XI

*1,1'[2,3-Bis(3-Aminophenyl)Butylidene-2,3]Ferrocene*

A 1-liter, four-neck flask was fitted with a mechanical stirrer, thermometer, condenser and dropping funnel. In the flask were placed 300 ml. dry ethylene glycol dimethyl ether and 0.33 mole 6-methyl-6-(3-aminophenyl)-fulvene. From the dropping funnel was slowly added with stirring 0.33 mole of sodium dispersed in xylene. The addition required one hour and the reaction was slightly exothermic. After refluxing for two hours the solution was homogeneous.

The above mixture was added to ferrous chloride (prepared by reduction of $FeCl_3$ by Fe powder in ethylene glycol dimethyl ether). The reaction was exothermic and the temperature was controlled at 20–25° C. by external cooling. The mixture was refluxed for two hours. The crude material was filtered, and the filtrate was stripped at 70° C. and reduced pressure of 5–10 mm. Hg. The residue was a brown, viscous oil. When this was washed with diethyl ether, light brown solids separated. These were filtered and dried, M.P. 145–150°. Washing with ethanol gave a product melting 160°–165° C.

EXAMPLE XII

*Polymerization of 1,1'-(2,3-Dimethylbutylidene-2,3)Ferrocene*

This dimethylfulvene-iron compound, prepared as in Example III, may be polymerized to a polymer by an aluminum chloride-acetyl chloride complex. A mixture of polymers results, which may be separated into an ether-soluble portion and an ether-insoluble portion. The soluble portion contains acetyl groups, the insoluble portion contains no acetyl groups.

A 500-ml., 4-neck creased flask fitted with a dropping funnel, mechanical stirrer, thermometer and condenser was purged with argon. To the flask was charged 200 ml. of freshly distilled $CH_2Cl_2$ and 20.4 g. (0.15 mole) of anhydrous aluminum chloride. Acetyl chloride (6.4 g., 0.08 mole) was added slowly through the dropper with stirring. The slightly exothermic reaction was complete in 30 minutes, 1,1'-(2,3-dimethylbutylidene-2,3) ferrocene (10.4 g., 0.04 mole) was dissolved in methylene chloride and added slowly to the mixture. The temperature was controlled at 20–25° C. The addition required 30 minutes, after which the stirring was continued for three hours.

After standing overnight the mixture was decomposed with a mixture of ice and dilute hydrochloric acid. The organic layer was washed with water and dried over anhydrous sodium sulfate. Evaporation gave a dark brown polymeric material. Extraction with ether gave an ether-soluble portion and an ether-insoluble portion. Both fractions were examined in the infra-red region, and were shown to be polymerized chains of dimethylfulvene-iron, in which the rings are connected intermolecularly rather than intramolecularly. In addition, the ether-soluble portion contained acetyl groups.

These polymers may be used to form hard polymer films; as stains for ceramics, and as protective polymer coatings deposited on rigid substrates such as porcelain ware and wood, from polymer solutions by evaporation or other removal of the solvent.

The new compounds are soluble in various organic solvents, e.g., chloroform, petroleum ether, ether, and ethylene glycol dimethyl ether, and in silicone oils such as dimethyl silicone oil.

In contrast to this, the previously known ferrocene compounds were not soluble in silicones. Thus, the new compounds are a means of putting iron into silicone oils for additive effects. Also, those products having olefinic unsaturation in the hydrocarbon side chains may be utilized to incorporate iron in vinyl-type polymers, thus rendering such polymers magnetically responsive, enabling novel applications of such polymers in electrical devices.

The fulveno-iron compounds have been found to be useful for the purposes and in the manners that follow.

An example of application of solutions of the fulvene compounds for protective or decorative purposes is to ceramic surfaces to achieve a decorative staining effect. The solutions applied may be, for example, one of the following:

(1) An ether solution of a polymeric dimethylfulvene-iron compound which contains acetyl groups;

(2) A methylene chloride solution of a polymeric dimethylfulvene-iron compound which contains no acetyl groups, and (3) An ether solution of 1,1'-(5-8-diethyldodecylidene-6,7)-ferrocene.

The solution is painted on the portion of the surface of the ceramic which is to be stained. After the solvent has evaporated, the ceramic is heated to 350° C. for 20 minutes. A light brown strain resulted which is not soluble in ether, neither does it wash off with soap and water. It is very resistant to acid and to base and lends a striking decorative color to the ceramic article treated.

Compounds of this invention may also be employed in effecting cure of epoxy polymers. Five grams of fulvene-iron containing two meta-aminophenyl groups were mixed with an equivalent amount of an epoxy polymer of molecular weight=390, containing two epoxy groups per molecule. This was heated in an oven at 150° C. for one hour. The resulting material was a hard, dark-red opaque resin.

Fulveno-iron compounds of this invention are also useful as ultra-violet absorbers. The fulveno-iron compounds made from 6-(3-heptyl)fulvene and 6-methyl-6-(3-aminophenyl)fulvene were examined in 0.2–0.5 g./liter concentrations in chloroform and found to be opaque below 3000 A. Thus they are good ultra-violet absorbers, and hence may be used for the protection of materials affected by ultra-violet light.

Compounds of this invention may also be used as accelerators for crosslinking silicone oil by ionizing radiation. Controlled experiments showed that a dimethyl silicone oil (100 cs.) containing 3 wt.-% of 1,1'-(5,8-diethyldodecylidene-6,7)-ferrocene crosslinked rapidly when subjected to ionizing radiation.

Since certain changes may be made in carrying out the above process and in the composition set forth without departing from the scope of the invention, it is intended that all matter contained in the above description shall be interpreted as illustrative and not in a limiting sense.

Having described our invention, what we claim as new and desire to secure by Letters Patent is:

1. As a composition of matter a polymer of a fulveno-iron compound having the structural formula

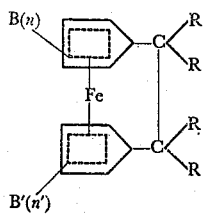

wherein B and B' are organic hydrocarbon radicals attached to the ring and are selected from the group consisting of monovalent substituents and divalent substituents in which one but not both of the fulvene ring double bonds is coordinately shared by an aromatic ring, $n$ and $n'$ are 0 to 4 when B or B' to which it pertains is monovalent and 0 or 1 when B or B' to which it pertains is divalent, and R is selected from the group consisting of a monovalent organic hydrocarbon radical and hydrogen.

2. As a composition of matter a polymer of 1,1'-(2,3-dimethylbutylidene-2,3) ferrocene.

References Cited in the file of this patent

Liebig's Annalen der Chemie, vol. 49 (1930), page 46.
Rosenblum: Thesis—Harvard Univ.; deposited for use in Harvard Library, Feb. 19, 1954, page 87.
Chem. and Eng. News, vol. 32, No. 40, Oct. 4, 1954, page 3960.